(12) United States Patent
Wack et al.

(10) Patent No.: US 6,334,816 B1
(45) Date of Patent: Jan. 1, 2002

(54) TORSIONAL VIBRATION DAMPER

(75) Inventors: Erwin Wack, Niederwerrn; Wolfgang Kundermann, Schweinfurt; Jörg Sudau, Niederwerrn; Christoph Sasse, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/492,992

(22) Filed: Jan. 27, 2000

(30) Foreign Application Priority Data

Feb. 5, 1999 (DE) .......................................... 199 04 850

(51) Int. Cl.⁷ ................................................. F16D 3/12
(52) U.S. Cl. ........................ 464/66; 192/212; 192/214; 464/67; 464/68
(58) Field of Search ............................. 464/66, 67, 68; 74/574; 192/212, 214, 214.1

(56) References Cited

U.S. PATENT DOCUMENTS

| | | | | |
|---|---|---|---|---|
| 4,223,776 A | * | 9/1980 | Berlioux ................. | 192/214.1 |
| 4,688,666 A | * | 8/1987 | Blond ....................... | 464/168 |
| 5,125,486 A | * | 6/1992 | Murata ..................... | 192/212 |
| 5,743,365 A | * | 4/1998 | Makino .................... | 192/212 |
| 5,934,426 A | * | 8/1999 | Hinkel et al. ............. | 192/212 |
| 6,056,093 A | * | 5/2000 | Hinkel ..................... | 192/212 |

FOREIGN PATENT DOCUMENTS

DE 197 24 973 10/1998

* cited by examiner

*Primary Examiner*—Lynne H. Browne
*Assistant Examiner*—Aaron Dunwoody
(74) *Attorney, Agent, or Firm*—Cohen, Pontani, Lieberman & Pavane

(57) ABSTRACT

A torsional vibration damper, especially for transmission of torque in a hydrodynamic torque converter, includes a primary side, a secondary side, and a plurality of damper spring arrangements arranged between the primary side and the secondary side such that the primary side is rotatable relative to the secondary side against an urgency of the damper spring arrangement. Each damper spring arrangement has at least one spring and is supported in each circumferential end area at a supporting area of the secondary side and at a first and a second supporting area of the primary side which are arranged on both axial sides of the associated supporting area of the secondary side. The primary side has a substantially annular carrier part and at least one of the first and second supporting areas of the primary side are constructed as separate parts that are connected for rotation with the primary side.

9 Claims, 3 Drawing Sheets

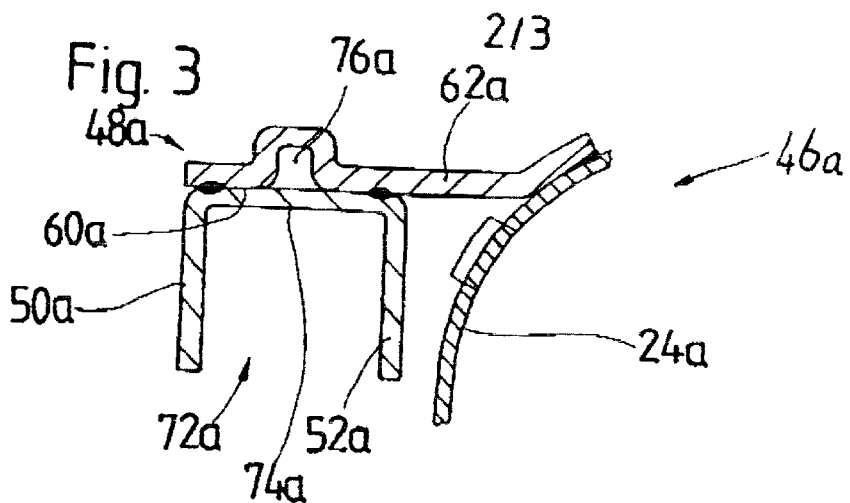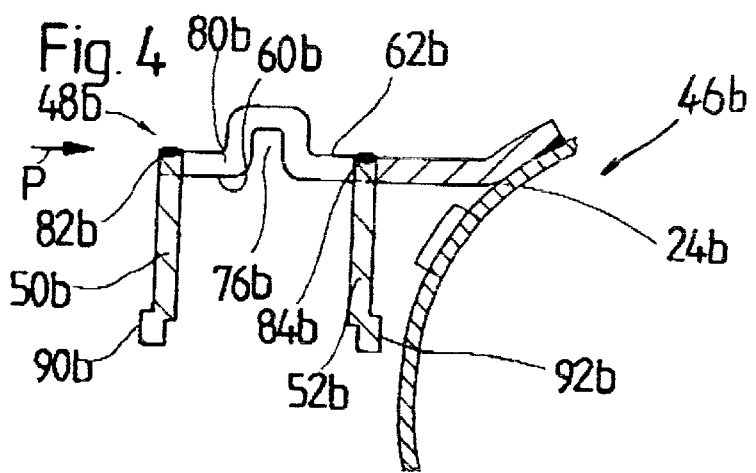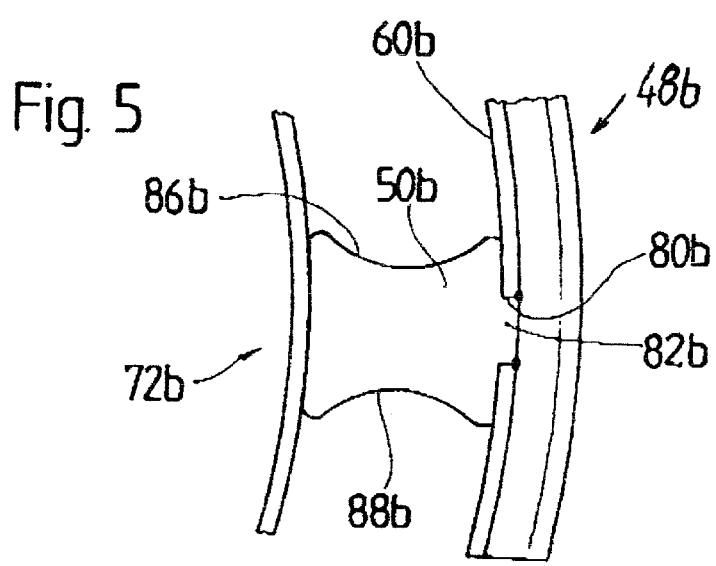

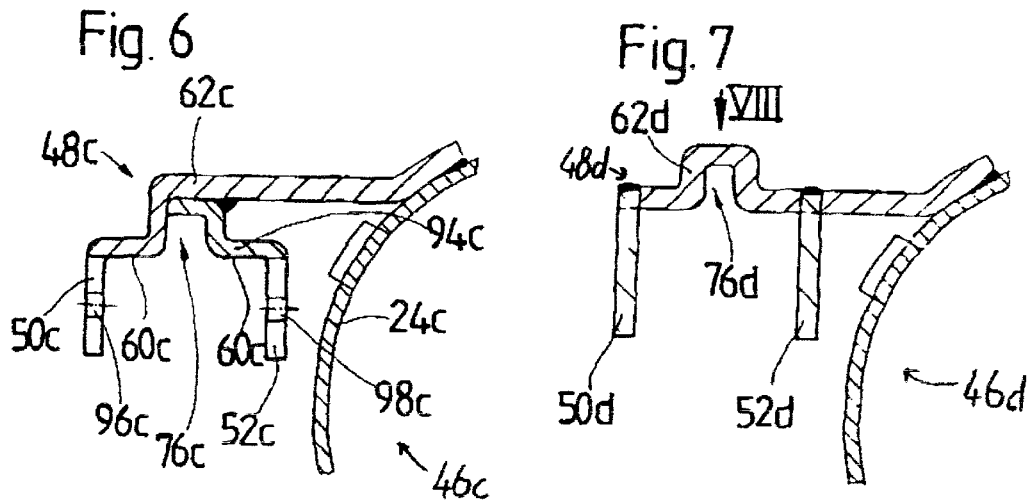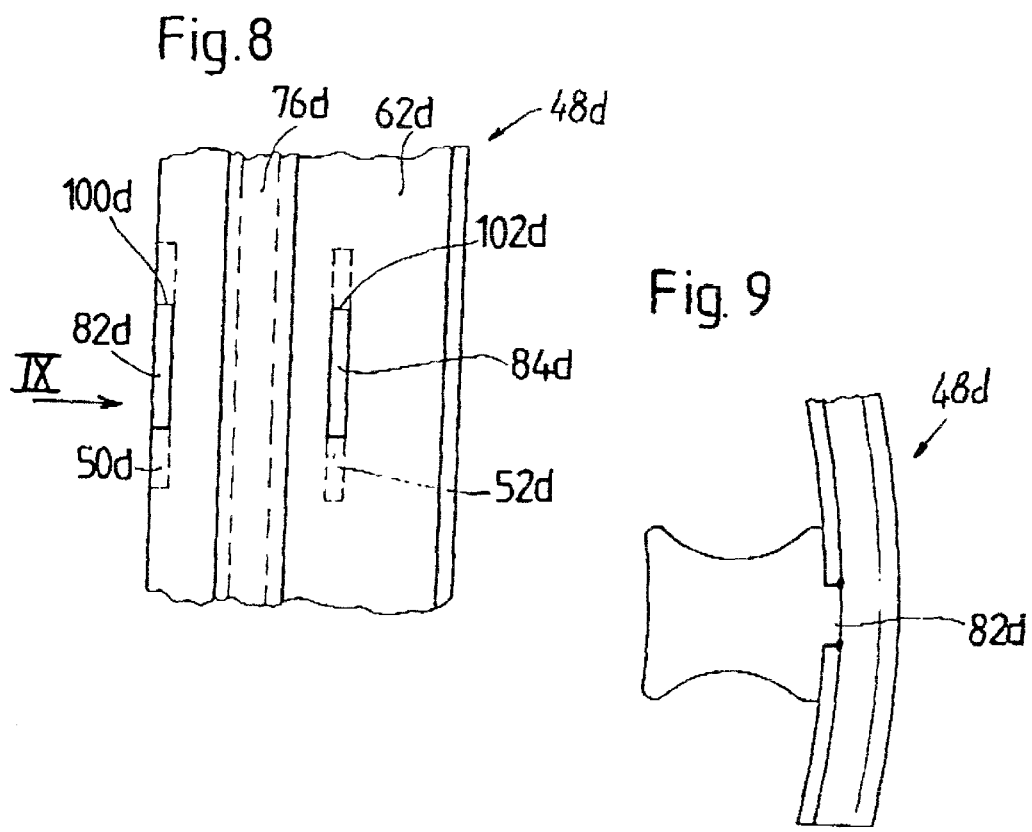

TORSIONAL VIBRATION DAMPER

BACKGROUND OF THE INVENTION

1. Field of the Invention

The present invention is directed to a torsional vibration damper, comprising a primary side, a secondary side and a plurality of damper spring arrangements, wherein every damper spring arrangement comprises at least one spring and can be supported in each circumferential end area at a supporting area of the secondary side and at a first and a second supporting area of the primary side which are arranged on both sides of the associated supporting area of the secondary side. More specifically, the present invention is directed to a torsional vibration for transmission of torque in a hydrodynamic torque converter.

2. Description of the Related Art

A prior art hydrodynamic torque converter is disclosed by DE 197 24 973 C1 having a torsional vibration damper arranged in a torque transmission path between a lockup clutch and a turbine wheel hub. This torsional vibration damper has a hub disk which is connected to a hub and which forms a plurality of supporting areas which are distributed in the circumferential direction. The torsional vibration damper further comprises cover disk elements forming another supporting area associated with each supporting area of the hub disk. The cover elements are located on both sides of the hub disk. Therefore, three supporting areas are located adjacent to one another in the axial direction, namely, two supporting areas of the cover disk elements which, for example, form a primary side, and a supporting area of the hub disk which, for example, forms a secondary side. Accordingly, groups of three supporting areas follow one another successively in the circumferential direction, wherein damper spring arrangements which are formed, for example, from an individual spring or a plurality of springs succeeding one another in the circumferential direction are supported respectively by their circumferential ends at the three supporting areas. Accordingly, spring windows in which the springs of a respective damper spring arrangement are received are formed between every two directly successive groups of spring windows along the circumferential direction. The two cover disk elements are connected with each other in their radial outer area by riveting. In addition, one of the cover disk elements is connected to the lockup clutch. Accordingly, the assembly of the torsional vibration is complex.

SUMMARY OF THE INVENTION

It is the object of the present invention to provide a torsional vibration damper that can be used for the transmission of torque in a hydrodynamic torque converter and which can provide a high degree of functional reliability in a simple construction.

The object is met by a torsional vibration damper according to an embodiment of the present invention for the transmission of torque in a hydrodynamic torque converter, the torsional vibration damper comprising a primary side, a secondary side and a plurality of damper spring arrangements, wherein every damper sing arrangement comprises at least one spring and is supportable at each circumferential end area against a supporting area of the secondary side and at a first and a second supporting area of the primary side which are arranged on both sides of the associated supporting area of the secondary side.

The primary side has a substantially annular carrier part and at least one of the first and second supporting areas is constructed separately and connected with the primary side.

A simple, highly stable construction is achieved by joining the primary side having, respectively, two axially adjacent supporting areas with an annular carrier part. In addition, the annular carrier part may take over additional functions such, for example, as the guidance of sliding elements of the damper spring arrangements.

The first and the second supporting areas of the primary side may each form a separate component group that is connected with the carrier part. In his way, a particularly simple production and a stable construction of the torsional vibration damper are simultaneously achieved.

When at least one of the first supporting areas and second supporting areas of the primary side in the torsional vibration damper according to the invention is connected with the carrier part as a separate structural component part, each of the individual parts which are to be connected with one another can be produced separately, for example, as a stamped part. The advantage herein consists in that waste can be minimized when carrying out the stamping process.

It is further possible for all first supporting areas and/or all second supporting areas to be connected to each other by a connection area to form a supporting area unit and for the respective supporting area unit to be fixed to the carrier part. This embodiment form has the special advantage that the process of joining can be simplified because not all of the supporting areas need to be arranged as individual components.

It is also possible for each pair of first and second supporting areas of the primary side to be connected by a connection area to form a supporting areas unit and for every supporting area unit to be connected with the carrier part. This likewise results in a damper which can be produced in a particularly simple manner without a large waste of material in which high stability is achieved especially in the area of the individual supporting areas.

The production process can be further simplified in that one of the first supporting areas and the second supporting areas of the primary side are constructed as one integral part with the carrier part. In this embodiment, the other respective one of the first and second supporting areas is connected as a separate component group with the carrier element.

To minimize the material waste occurring during production, the other one of the first and second supporting areas may be connected, as separate structural component parts, with the carrier part.

However, when the other one of the first and second supporting areas is constructed in one part with an annular carrier which is connected with the carrier part, the production process can be further simplified because the quantity of components to be joined to one another is reduced.

In a construction of a torsional vibration damper of the types mentioned above, it is not absolutely necessary that the supporting areas which are to be connected to the carrier part are directly connected therewith. For example, the other one of the first and second supporting areas may also be secured to a connection component and the carrier element can be secured to the connection component for connection with the other one of the first and second supporting areas. That is, the connection is carried out indirectly via the connection component without the components which are to be connected with one another last being fixedly connected directly with one another or even coming into direct physical contact with one another.

When the torsional vibration damper according to the present invention is used in a hydrodynamic torque converter, the connection component may be, for example, the turbine wheel shell of the hydrodynamic torque converter.

Also, in embodiment forms in which the components such, for example, as the primary side, of the torsional vibration damper which are to be connected with one another are not connected with the intermediary of a component of the hydrodynamic torque converter, a joining area may be provided at the carrier part or at the supporting areas to be connected therewith as a separate component group joined with, for example, a turbine wheel shell of a hydrodynamic torque converter.

As stated above, the construction of a torsional vibration damper according to the invention allows a multiple function to be integrated in a simple manner in the different functional groups of the torsional vibration damper. For example, every damper spring arrangement may have at least one sliding element by which a spring of the same is supported at the associated supporting areas or at another spring, and the carrier element may have at least a part of a sliding path for the at least one sliding element.

A particularly stable and easy-to-produce construction is achieved when at least one of the first and second supporting areas is connected with the carrier part by welding.

The present invention is further directed to a hydrodynamic torque converter with a torsional vibration damper according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 is a partial longitudinal sectional view showing a portion of a further embodiment of a torsional vibration damper according to another embodiment of the present invention;

FIG. 4 is a partial longitudinal sectional view showing a portion of a further embodiment of a torsional vibration damper according to another embodiment of the present invention;

FIG. 5 is a side view of the portion of the torsional vibration damper shown in FIG. 4;

FIG. 6 is a partial longitudinal sectional view showing a portion of a further embodiment of a torsional vibration damper according to another embodiment of the present invention;

FIG. 7 is a partial longitudinal sectional view showing a portion of yet a further embodiment of a torsional vibration damper according to another embodiment of the present invention;

FIG. 8 is a view of the portion of the torsional vibration damper shown in FIG. 7 as viewed along the direction indicated by arrow VIII in FIG. 7;

FIG. 9 is a view of the portion of the torsional vibration damper shown in FIG. 8 as viewed along the direction indicated by arrow IX in FIG. 8.

DETAILED DESCRIPTION OF THE PRESENTLY PREFERRED EMBODIMENTS

Figure 1:
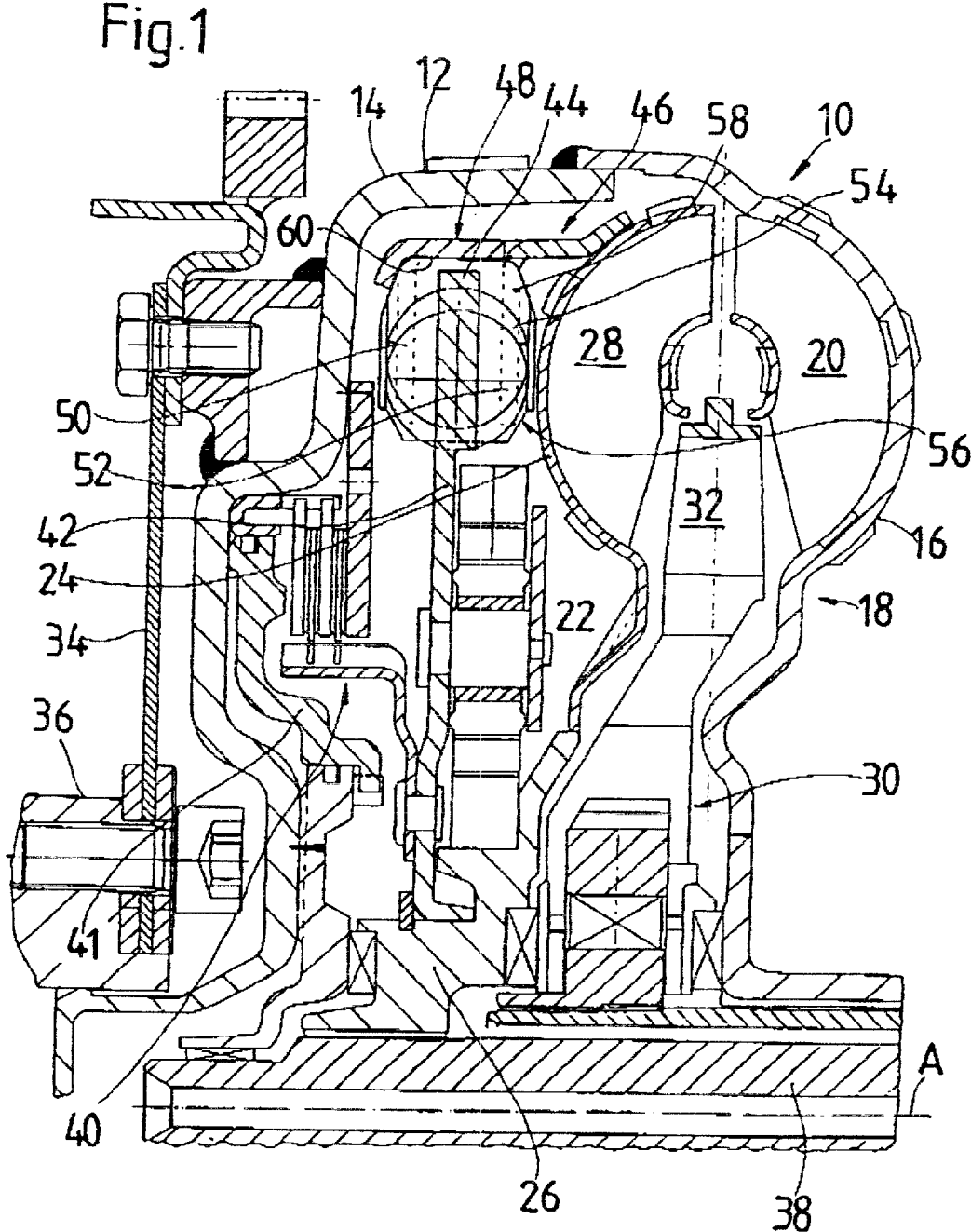
FIG. 1 is a partial longitudinal sectional view through a hydrodynamic torque converter with a torsional vibration damper according to an embodiment of the present invention.

FIG. 1 shows a hydrodynamic torque converter 10 with a torsional vibration damper 46 according to an embodiment of the present invention. The construction of the torque converter is known in principle and will be described briefly in the following. The torque converter 10 has a housing 12 including a housing cover 14 and an impeller wheel shell 16 of an impeller wheel 18. The connection of the impeller wheel shell 16 to the housing cover 14 is made by welding. The impeller wheel shell 16 carries a plurality of impeller wheel blades 20 along an inner side. A turbine wheel 22 is arranged in the interior of the torque converter 10 and includes a turbine wheel shell 24 and a turbine wheel hub 26. A plurality of turbine wheel blades 28 are positioned in a successive manner in the circumferential direction in the turbine wheel shell 24. A stator wheel 30 having a plurality of stator wheel blades 32 is located between the turbine wheel 22 and the impeller wheel 18.

The converter housing 12 is coupled via a flex-plate 34 with a drive shaft such, for example, as an engine crankshaft 36 (the engine crankshaft is indicated only schematically) so that the converter housing 12 is fixed with respect to rotation relative to the engine crankshaft 36. The output of the torque converter 10 forms a transmission input shaft 38 which is coupled with the turbine wheel hub 26 so that the transmission input shaft 38 is fixed with respect to rotation relative to the turbine wheel hub 26. Furthermore, a lockup clutch 40 is arranged in the torque converter 10 with a clutch piston 41, wherein a direct torque transmission connection between the housing cover 14 and the turbine wheel 22 may be produced by the lockup clutch 40 via a displacement of a clutch piston 41. In the torque converter 10 of FIG. 1, the direct torque transmission connection is produced between the housing cover 14 and the turbine wheel shell 24 of the turbine wheel 22. For effecting this connection, the lockup clutch 40 is fixedly connected with a hub disk 42 of the torsional vibration damper 46, wherein the hub disk 42 has a plurality of supporting areas 44 distributed in the circumferential direction in a manner known per se at its radial outer area. The torsional vibration damper 46 further has a component group 48 connected with the turbine wheel shell 24 having corresponding supporting areas 50, 52 associated with each supporting area 44 of the hub disk 42. Accordingly, when the torsional vibration damper 46 is unloaded, the three supporting areas 50, 44, 52 are located adjacent to one another in the axial direction of a rotational axis A of the torque converter 10. Springs 54 (indicated schematically) of a respective damper spring unit 56 are located in a manner known per se in spring windows formed between groups of supporting areas 50, 44, 52 which follow one another in the circumferential direction. Each of these damper spring units 56 accordingly comprises at least one spring 54 of the type mentioned above. One of the end areas of the damper spring unit 56 is supported via spring bushings or spring shoes 58, as they are called, at a first group of supporting areas 50, 44, 52, and a second end area of the damper spring unit 56 is supported via a corresponding spring shoe 58 at a group of supporting areas 50, 44, 52 following in the circumferential direction. During a relative rotation between the hub disk 42 and the component group 48, one of the spring shoes 58 associated with a respective damper spring unit 56 is driven or carried along by a supporting area 44 and the spring shoe 58 positioned at the other end of the damper spring unit 56 is driven by the supporting areas 50, 52 of the group of supporting areas directly following the latter. It is noted that each of these damper spring units 56 positioned between successive groups of supporting areas may comprise a plurality of springs 54, wherein directly successive springs are then preferably supported against one another via sliding blocks or sliding shoes (not shown), as they are called, wherein the sliding shoes essentially correspond to the construction and function of the spring shoes 58. A sliding path 60 arranged at the component group 48 supports the spring shoes 58 and the sliding blocks or sliding shoes (if any). The sliding path 60 will be described in more detail below.

Figure 2:
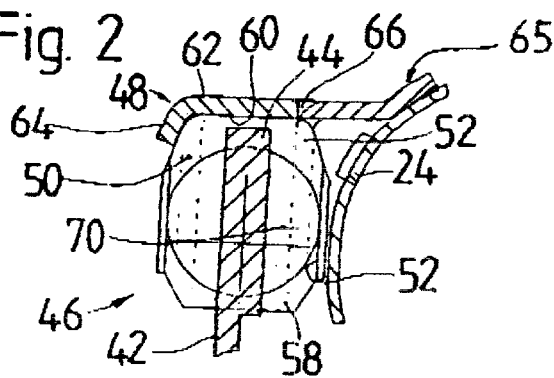
FIG. 2 is a more detailed view of the torsional vibration damper as shown in FIG. 1.

FIG. 2 is an enlarged view of the torsional vibration damper 46 from FIG. 1. In the following description of the torsional vibration damper 46 of the torque converter 10, the hub disk 42 will be referred to hereinafter as the secondary side 42 of the torsional vibration damper 46 and the component group 48 will be referred to hereinafter as the primary side 48 of the torsional vibration damper 46. FIG. 2 shows that every supporting area 44 at the secondary side 42 is formed by a radial projection which may be additionally strengthened by kinking or bending. The primary side 48 by which the torsional vibration damper 46 is joined to the turbine wheel shell 24 comprises a carrier part 62 which revolves around the rotational axis A of the converter and is constructed so as to be essentially cylindrical in its central area 60. A plurality of tabs 50 following one another in the circumferential direction are bent radially inward from the carrier part 62 on one side and form the respective supporting areas for the spring shoes 58. Short areas 64 which form an axial stop surface or guide surface for the spring shoe 58 at one axial side are bent between the tabs or supporting areas 50 following one another in the circumferential direction. At the other axial side, the spring shoes 58 are held against axial movement by the outer surface of the turbine wheel shell 24.

Toothing projections 66 that extend toward the turbine wheel shell 24 are formed successively in the carrier part 62 along the circumferential direction at an axial side of the carrier part 62 located opposite from the bent portions 64. The toothing projections 66 have gaps between them in the circumferential direction. The gaps are located essentially in the area of the bent tabs or supporting areas 50. Supporting areas 52 are inserted into these gaps as separate structural component parts, so that a fixed relative positioning on the circumference between adjacent pairs of the supporting areas 50 and 52 is achieved.

The supporting areas 52 as well as the toothing projections 66 each have joining areas 65 that extend axially up to the turbine wheel shell 24 and are connected with the turbine wheel shell 24 in a weld which preferably extends circumferentially. This welding is preferably carried out by laser welding. In this way, a primary side 48 is provided for the torsional vibration damper 46 in which the carrier part 62, with the supporting areas 50 provided at this carrier part 62, and the supporting areas 52 provided as separate structural component parts are fixedly connected with one another by their connection to the turbine wheel shell 24. Accordingly, a direct fixed connection is not necessarily required between the supporting areas 52 and the carrier part 62. At the same time, a defined, fixed circumferential positioning and connection of these two component groups with one another is provided because of the tooth-like meshing of the toothing projections 66 and the supporting areas 52.

FIG. 2 also shows a bulge line 70 which indicates that the supporting areas 52 can bulge out axially so as to be supported at the turbine wheel shell 24, so that increased axial stability is obtained.

Another embodiment of a torsional vibration damper 46a with a primary side 48a is shown in FIG. 3. Components corresponding to the components described above with respect to construction and operation are designated by the same reference numbers with a suffix "a". As shown in FIG. 3, a substantially annular carrier pan 62a is provided which extends either continuously in the circumferential direction or extends with individual projections up to the turbine wheel shell 24a and is secured thereto by welding. A plurality of U-shaped supporting area units 72a (one is shown) are distributed successively in the circumferential direction and are secured, for example, by welding to an inner circumferential surface 60a of the carrier part 62a. The inner circumferential surface 60a of the carrier part 62a simultaneously forms the sliding surface for the spring shoes or the above-mentioned sliding shoes. Each of these U-shaped supporting area units 72a comprises a supporting area 50a, a supporting area 52a and a connection area 74a integrally connecting these two supporting areas 50a, 52a. A quantity of supporting area units 72a corresponding to the quantity of damper spring arrangements or units (56 in FIG. 1) is provided at the carrier part 62a and distributed around the rotational axis A of the torque converter 10 (see FIG. 1). In his way, the torsional vibration damper 46a and the primary side 48a for this torsional vibration damper can be constructed in a particularly simple manner, wherein individual parts, that is, the supporting element units 72a and the carrier part 62a, may be developed in a simple manner by stamping. It is noted that the carrier part 62a may also be obtained by a drawing process, that is, it can be drawn from an annular blank. Furthermore, the carrier part 62a may also be obtained by bending strip material and butt-welding the end areas of the same. The embodiment shown in FIG. 3 also shows a guide groove 76a in the carrier part 62a in which the respective spring shoes or sliding shoes are secured against axial movement, i.e., the spring shoes or sliding shoes engage via a glide projection in this groove 76a which extends in the circumferential direction.

Another embodiment of a primary side 48b of the torsional vibration damper 10b is shown in FIGS. 4 and 5. Components corresponding to the components described above are designated by the same reference numbers with a suffix "b". A carrier part 62b has a plurality of cutouts 80b arranged successively in the circumferential direction. Individual supporting areas 50b, 52b have fastening portions 82b, 84b that are introduced into these cutouts 80b. FIG. 5 shows that each of the supporting areas 50b, 52b in both circumferential directions has a control edge 86b, 88b for supporting the springs of different damper spring units or spring shoes thereof. The respective groups of supporting areas 50b and 52b are connected with one another on the radial inner side by respective connection ring portions 90b, 92b to form supporting area units 72b. Each of the supporting area units 72b formed from the connection ring portion 90b and the supporting areas 50b and from the connection ring portion 92b and the supporting areas 52b is pushed into the carrier part 62b in FIG. 4 in the direction of arrow P and securely welded after positioning the fastening portions 82b and 84b, respectively, in the cutouts 80b. In this way, a defined positioning of the individual supporting areas of the primary side 48b with respect to one another is achieved in the circumferential direction. Further, an additional axial supporting of the different springs of the damper spring units is produced by the connection ring portions 90b, 92b.

It is noted that also in the embodiments according to FIGS. 1 and 2 and the embodiment according to FIG. 3, the individual supporting areas 50, 50a, 52, 52a have the tab-like shape with respective control edges for the springs which is shown in the view of supporting areas 50b, 52b in FIG. 5.

A further embodiment showing a primary side 48c of a torsional vibration damper 46c is shown in FIG. 6. In this case, the components are distinguished by reference characters with a suffix "c". A carrier part 62c according to this embodiment forms only one area of a sliding surface 60c for the spring shoe and sliding shoe. In a bent transitional area for a guide groove 76c, the carrier part 62c is connected by welding with a likewise annular carrier 94c shaped in a complementary manner, so that the annular carrier 94c also forms a part of the sliding surface 60c, namely, with its approximately cylindrical portion, and likewise defines the groove 76c by an area which is bent twice. A plurality of tabs which are bent away from the carrier part 62c and which form the supporting areas 50c are distributed in the circumferential direction. A plurality of tabs are distributed in the circumferential direction and are bent away from the annular carrier 94c and form supporting areas 52c which correspond to the supporting areas 50c. To achieve and exact alignment of the supporting areas 50c and 52c when joining the carrier part 62c with the annular carrier 94c, a pair of alignment openings 96c, 98c is provided in at least one pair of supporting areas 50c, 52c, wherein a positioning pin or fixing pin may be guided through the alignment openings 96c, 98c to hold the carrier 94c and carrier part 62c in a defined circumferential position relative to one another during assembly. This pin is subsequently removed when the assembly of the primary side 48c is complete. The carrier part 62c extends to the turbine wheel shell 24c and is welded thereto.

The advantage of the embodiment of FIG. 6 is that only two parts, each of which may be obtained by a drawing process, are connected with one another to form the primary side 48c. Accordingly, the production process is very simple and primary side 48c has a high stability results at the same time.

FIGS. 7 to 9 show yet another embodiment of the present invention including a primary side 48d. In this case, components with reference numbers identical to those mentioned above are designated with a suffix "d". The embodiment shown in FIGS. 7 to 9 corresponds substantially to the embodiment form shown in FIGS. 4 and 5, except that the individual supporting areas 50d and 52d in FIGS. 7 to 9 are not joined to form respective supporting area units by connection ring areas. Rather, all of the supporting areas 50d, 52d are connected, respectively, as separate structural component parts with the carrier part 62d. For this purpose, as can be seen in FIG. 8, the carrier part 62d has pairs of openings following one another in the circumferential direction. These pairs of opening comprise lateral open recesses 100d, 102d in which respective fastening portions 82d and 84d of the supporting areas 50d and 52d engage and are fixedly welded. The advantage of this embodiment form is that the individual parts can again be obtained by a stamping process, wherein there is only a very slight waste of material during the stamping process. This embodiment also includes guide grooves 76d for the spring shoes and sliding shoes in the carrier part 62d.

The preceding description was directed to various embodiment forms of a torsional vibration damper, especially to a primary side of the torsional vibration damper, which can be used advantageously in a hydrodynamic torque converter because of their structural arrangement. It is noted that this type of construction of the primary side of a torsional vibration damper could also be used in different areas such, for example, as a clutch disk or a dual-mass flywheel. Concerning the expressions "primary side", and "secondary side", as used in the present text, it is noted that these expressions should not be viewed as limiting in any way with respect to the direction of torque transmission. That is, a torque may be introduced from the primary side and delivered to the secondary side or conducted in the reverse direction. All of the embodiment forms described above have the advantage that a very economical and, at the same time, stable and reliably functioning construction may be achieved by joining a plurality of parts which are obtainable by a stamping process.

The invention is not limited by the embodiments described above which are presented as examples only but can be modified in various ways within the scope of protection defined by the appended patent claims.

We claim:

1. A torsional vibration damper, comprising:
   a primary side rotatable about an axis of rotation;
   a secondary side rotatable about the axis of rotation relative to said primary side;
   at least one damper spring arrangement having two circumferential ends and comprising at least one spring arranged between said primary side and said secondary side such that said secondary side is rotatable relative to said primary side against an urgency of said at least one damper spring arrangement;
   a plurality of groups of supporting elements for supporting circumferential ends of said at least one spring arrangement, wherein each of said plural groups of supporting elements comprises a secondary supporting area operatively connected for movement with said secondary side and first and second primary supporting areas operatively connected for movement with said primary side and arranged on opposing axial sides of said secondary supporting area; and
   said primary side comprising a carrier part holding said first and second primary supporting areas, wherein at least one of said first and second primary supporting areas comprises a separate part fixedly connected to said carrier part, wherein said at least one damper spring arrangement comprises at least one sliding element by which said at least one spring of said at least one damper spring arrangement is supported at said group of supporting areas, and wherein said carrier element comprises at least one part of a sliding path for said at least one sliding element.

2. The torsional vibration damper of claim 1, each of said first and second primary supporting areas comprises a separate component operatively connected for movement with said carrier part.

3. The torsional vibration damper of claim 1, wherein each of said first and second primary supporting areas of each of said plural groups of supporting elements comprises a separate component fixedly connected to said carrier part.

4. The torsional vibration damper of claim 1, further comprising a connection area connected to each of said first primary supporting areas, wherein said connection area and said first primary supporting areas comprise a supporting area unit fixedly connected to said carrier part.

5. The torsional vibration damper of claim 1, wherein said first primary supporting areas are constructed as an integral part with said carrier part and said second primary supporting areas are connected as a separate component group to said carrier element.

6. The torsional vibration damper of claim 5, wherein said second primary supporting areas are connected as a separate structural component part of said carrier part.

7. The torsional vibration damper according to claim 5, further comprising a separate annular carrier connected to said carrier part, wherein said second primary supporting areas are constructed as one part with said separate annular carrier.

8. A The torsional vibration damper of claim 1, wherein said at least one of said first and second primary supporting areas is connected to said carrier part via welding.

9. A hydrodynamic torque converter comprising a torsional vibration damper, wherein said torsional vibration damper comprises:

a primary side rotatable about an axis of rotation;

a secondary side rotatable about the axis of rotation relative to said primary side;

at least one damper spring arrangement having two circumferential ends and comprising at least one spring arranged between said primary side and said secondary side such that said secondary side is rotatable relative to said primary side against an urgency of said at least one damper spring arrangement;

a plurality of groups of supporting elements for supporting circumferential ends of said at least one spring arrangement, wherein each of said plural groups of supporting elements comprises a secondary supporting area operatively connected for movement with said secondary side and first and second primary supporting areas operatively connected for movement with said primary side and arranged on opposing axial sides of said secondary supporting area; and said primary side comprising a carrier part holding said first and second primary supporting areas, wherein at least one of said first and second primary supporting areas comprises a separate part fixedly connected to said carrier part, wherein said at least one damper spring arrangement comprises at least one sliding element by which said at least one spring of said at least one damper spring arrangement is supported at said group of supporting areas, and wherein said carrier element comprises at least one part of a sliding path for said at least one sliding element.

* * * * *